United States Patent
Faille et al.

[15] 3,692,816
[45] Sept. 19, 1972

[54] ORGANOMINERAL POLYMERIC MATERIAL

[72] Inventors: Marc della Faille, 27 Rue Baron De Castro, Bruxelles 1040; Jose Fripiat, 42 De Croylaan, Heverlee, Louvain; Jean Mercier, Trolieberg 31, Kessel-Lo, all of Belgium

[22] Filed: Oct. 26, 1970

[21] Appl. No.: 84,120

[30] Foreign Application Priority Data

Nov. 6, 1969 France..................6932816

[52] U.S. Cl..........260/46.5 R, 260/2 S, 260/41.5 A, 260/46.5 G, 260/46.5 E, 260/827
[51] Int. Cl...............................C08f 11/04
[58] Field of Search....260/46.5 G, 827, 41.5 A, 2 SI, 260/46.5 E

[56] References Cited

UNITED STATES PATENTS 3,436,252   4/1969   Neuroth et al............117/155
3,471,588   10/1969  Kanner et al.............260/827

OTHER PUBLICATIONS

Linksy et al., Planar Organosilicon Polymers, Journal of Polymer Science, Part A–2, Vol. 9, pg. 143 to 160, 1971.
Hurlbut, Jr., Mineralogy, 17th ed. 1959, Cover Pg., pp. 394, 398, 415, 423, 435, 459, 463 and 475.
Bedford et al., Sheet–Like Organosilicon Polymers Derived From the Minerals Chrysotile and Apophyllite, Abstract No. 059, 152nd National Meeting of the American Chemical Society (New York) Sept. 1966.
Frazier et al., Inherently Fibrous Polymer, Inorganic Chemistry, Vol. 6, No. 9, Sept. 1967, pp. 1693 to 1696.
Lentz; Silicate Minerals as Sources of Trimethylsilyl Silicates and Silicate Structure Analysis of Sodium Silicate Solutions, Inorganic Chemistry, Vol. 3, No. 4, April, 1964, pp. 574 to 579.

*Primary Examiner*—Donald E. Czaja
*Assistant Examiner*—M. I. Marquis
*Attorney*—Cameron, Kerkam & Sutton

[57] ABSTRACT

The material comprises a siliceous mineral framework constituted by the two-dimensional framework of a phyllosilicate and organic radicals having a reactable group which is capable of polymerization, the radicals being linked by Si-O-Si siloxane bonds to the tetrahedral layer of the phyllosilicate from which a fraction of the octahedral layer has been removed. The method of preparation of the material comprises acid hydrolysis of a phyllosilicate for the partial removal of the octahedral layer followed by reaction of the phyllosilicate with an organosilane having at least one reactable organic group which is capable of subsequent polymerization.

9 Claims, No Drawings

ORGANOMINERAL POLYMERIC MATERIAL

This invention relates to a novel polymeric material of organomineral composition which is provided especially in the form of fibers. This material is intended for use as a strengthening filler for elastomers and for resins. The invention is also directed to a method of preparation of this material and to its applications, especially to the formation of elastomers.

It has already been proposed to form polymeric material having a silicic mineral framework and polymerizable organic radicals having an ethylene double bond, for example. It is known in particular to graft organosilanic radicals on the silicic mineral. However, in known materials, the organic radicals are usually linked superficially to the mineral by means of M-O-Si bonds wherein M is a metallic atom which is different from silicon and these bonds are very delicate. On the other hand, Si-O-Si siloxane bonds between the organic radical and the mineral framework are much stronger but have been obtainable up to the present time only in the case of particular minerals such as hydrated silica or glass fibers.

The object of the invention is to graft polymerizable organosilanic radicals on a mineral framework of siliceous nature and more particularly on the two-dimensional silicic framework of the phyllosilicates. Thus, in the application of the invention, in order to form the mineral framework of the organomineral polymeric material, phyllosilicates are employed as starting minerals, namely minerals which have in their structure at least one tetrahedral layer of silica and oxygen and at least one octahedral layer containing magnesium, aluminum and/or iron in particular. Within the scope of the invention, these minerals are preferably of the lamellar type such as micas, hydromicas and vermiculite or of the fibrous type such as chrysotile or possibly sepiolite, to mention only some examples which are particularly common but are not given in any sense by way of limitation.

The invention proposes a novel organomineral polymeric material of the type comprising a silicic mineral framework and organic radicals having a reactable group which is capable of polymerization. The invention is characterized in that said framework is constituted by the two-dimensional framework of a phyllosilicate and that said radicals are linked by Si-O-Si siloxane bonds to the tetrahedral layer of the phyllosilicate, a fraction which is preferably at least equal to 5 percent by weight of the metallic atoms of the octahedral layer being removed from said phyllosilicate.

According to a preferred embodiment of the material according to the invention, the organic radicals have at least one ethylene double bond which is capable of polymerization. However, the other reagent groups which are known to assist polymerization can also be employed.

The invention also proposes a method of preparation of an organomineral polymeric material as hereinabove defined which is essentially characterized in that it comprises an acid hydrolysis of a phyllosilicate, especially in order to eliminate at least 5 percent by weight of the metallic atoms of the octahedral layer and the reaction of said phyllosilicate with an organosilane having at least one reactable organic group which is capable of subsequent polymerization and also has at least one hydroxyl group, a halogen or an alkoxy group which is fixed on the silicon of the organosilane molecule or has the disiloxane function.

Preferably, the acid hydrolysis is combined with the reaction with the organosilane, this reaction being carried out in the presence of a mineral acid. Moreover, the reaction is advantageously carried out in the presence of an alcohol in order to protect the silanol groups which are formed.

Thus, in a preferred mode of application of the invention, the treatment of the phyllosilicates is performed in a single step which makes it possible to carry out three operations:

1. — A variable proportion of the octahedral layer is eliminated by the acid treatment. In the case of a magnesium layer, for example, the fraction which is eliminated comprises $Mg(OH)_2$ groups which are replaced by silanols $\equiv$ Si—OH for the grafting operation.
2. — Accessibility of the silanolic grafting sites which are thus created for the organic compounds is ensured by forming an "opening" in the mineral by defibering or by defoliation.
3. — There takes place a chemical linkage of the organosilanic chains with the tetrahedral silica layers which are thus freed.

A more or less substantial substitution of the octahedral layers (especially the magnesium layers) is generally obtained by grafting of siloxane groups carrying polymerizable organic radicals and especially unsaturated radicals. Depending on the desired properties of the product, the grafting rate can vary between 1 and 30 percent of the silicon atoms of the tetrahedral layer. Nevertheless, the external morphology of the treated phyllosilicate is preserved by reason of the fact that the grafting reaction in acid medium retains the integrity of the basic silicic framework.

By way of comparison, the reaction of a phyllosilicate with an organosilane as hereinabove defined but without acid hydrolysis of the octahedral layer would permit the attainment of only very low grafting rates of less than 1 percent whereas the method according to the invention with acid hydrolysis makes it possible on the contrary to attain very high grafting rates of up to 30 percent of the silicon atoms of the tetrahedral layer without any appreciable destruction of the basic silicic structure of the mineral. There is also observed a considerable increase in the specific surface area with respect to the base mineral. From the point of view of macromolecular chemistry, the compounds obtained come in the category of 2-dimensional polymers.

The materials according to the invention exhibit special properties which make them very useful as strengthening agents in the polymerizable products. It appears that these properties are essentially due to the organomineral nature and to the strength of the siloxane bonds. Moreover, the invention makes it possible by treatment of the phyllosilicates to obtain polymers in which the organic composition represents a substantial fraction with respect to the mineral base and which have a high specific surface area.

In accordance with one application which is more particularly contemplated by the invention, a material of this type can itself constitute an elastomer which can undergo all the usual treatments of conventional elastomers such as vulcanization while exhibiting very considerably improved properties. In the case of an application of this type, preference is given to the use of a material which is formed from phyllosilicates and silanes having at least one unsaturated organic substituent comprising at least three carbon atoms.

In one preferred embodiment, the materials in accordance with the invention appear to correspond to the following formula:

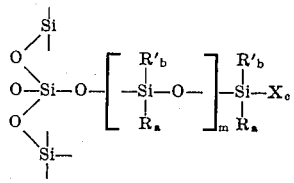

wherein R represents an organic radical having two to 12 carbon atoms and containing at least 1 ethylenic double bond, R' represents a hydrogen atom or an alkyl radical and X represents a halogen atom or a hydroxyl group wherein a is a whole number equivalent to 1 or 2, b is a whole number between 0 to 2, and wherein the sum $(a+b+c)$ is equivalent to 3.

Depending on the nature of the chain which is grafted on the tetrahedral base and depending on the grafting rate achieved, the polymer which is obtained will be either a strengthening filler or the actual base of an elastomer which is capable of vulcanization by methods which are well known to those versed in the art.

In the case in which the main object of utilization is the reinforcement of a resin, a low grafting rate will be adopted. In the case of reinforcement of rubber materials, a higher grafting rate will be employed. On the other hand, if the object to be achieved is the formation of an organosilicic elastomer, a high grafting rate and a longer side chain containing at least three carbon atoms will accordingly be adopted.

The complete formula of the polymeric material is closely dependent on the conditions of preparation. Thus, the grafting reaction is carried out in the presence of a mineral acid such as hydrochloric acid, sulphuric acid, nitric acid, the concentration and temperature of which will be adapted to the desired reaction kinetics; similarly it would be possible to employ gaseous HCl dissolved in an alcohol. These acids are preferably accompanied by a saturated alcohol such as methanol, ethanol, isopropanol, ketone or an ether.

The reaction is generally brought to a temperature which is compatible with the boiling point of the organo-silane which is employed conjointly. Said organosilicic agent has the form:

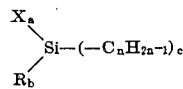

wherein X represents an atom of halogen or a hydroxyl or alternatively an alkoxy group, R represents an atom of hydrogen or an alkyl radical and wherein a is a whole number from 1 to 3, b is a whole number from 0 to 2, with $(a + b + c) = 4$, and wherein n is equal to or greater than 2.

Since the above-mentioned silane which is preferably mono- or dihalogenated is added to the basic silicic mineral at the start of the reaction at the same time as the acid and the alcohol, it would seem that the organosilicic radical is capable of becoming attached to the tetrahedral chain as soon as the grafting sites are created and before two adjacent silanols have been able to dimerize so as to form a siloxane bond, thus blocking grafting sites.

By polymerization of monomers derived from mono- or diolefins on the polymeric material produced according to the present invention, there are thus obtained organomineral block copolymers which can be shaped by known means or vulcanized.

The temperature strength of these polymers is highly improved and the modulus of elasticity can be increased to a considerable extent.

In order to specify the conditions of application of the method of preparation of an organomineral polymeric material according to the invention, it has appeared to be particularly advantageous to carry out the reaction of organosilane with phyllosilicate in a single step at a pH < 2 with an acid-alcohol mixture having a normal concentration between 2 and 8 and preferably between 3 and 5 at a temperature within the range 15° to 80° C and preferably between 25 and 40° C while employing a quantity of phyllosilicates such that the proportion of solid material in the acid-alcohol mixture is within the range of 10 to 500 g/l and preferably 40 to 100 g/l and a quantity of organosilane such that the weight ratio between the organosilane and the phyllosilicate is lower than 1 and preferably between 0.05 and 0.5. These conditions apply especially to the treatment of chrysotile fibers having dimensions within the range of 200 microns and 4 millimeters.

Depending on the particular modes of application of the method, it is possible especially:

1. either to remove by acid hydrolysis 5 to 25 percent by weight of the octahedral layer of the phyllosilicate, this being carried out, for example, by means of an acid treatment with 6N hydrochloric acid at 50° C for a period varying between 10 minutes and 10 hours and to graft the silanic radicals simultaneously on 5 to 30 percent of the silanolic sites which are formed on the tetrahedral layer, the material thus obtained being particularly well suited to an application as strengthening filler for resins;

2. or to remove by acid hydrolysis from 25 to 100 percent by weight of the octahedral layer, this being carried out, for example, by means of an acid treatment with 6N hydrochloric acid at 50° C for a period varying between 3 and 50 hours and to graft the silanic radicals on 5 to 30 percent of the silanolic sites of the tetrahedral layer, the material thus obtained being particularly well suited to an application as strengthening filler for elastomers.

The following examples are given by way of explanatory illustration but are not intended to imply any limitation of this invention.

EXAMPLE 1

One hundred and twenty grams of short fibers of the chrysotile type (having a surface area of the order of 15 m²/g as measured with nitrogen in accordance with the B.E.T. method) were placed in a reaction vessel containing 5,000 cm³ of 12N HCl, 5,000 cm³ of isopropanol and 240 cm³ of methylvinyldichlorosilane; the aggregate was agitated, heated and refluxed at 50° C for a period of 56 hours. On completion of the reaction, the mixture was filtered, washed with methanol and the fiber was dried. The reaction made it possible to extract under these conditions 40 % of MgO. The reaction mixture can be employed again until depletion of the active components by reaction with further quantities of fiber (see examples 2 and 3). By means of a Soxhlet extractor, the fiber was then subjected to extraction with benzene for a period of 24 hours in order to eliminate the soluble polymer which could result from polycondensation of the methylvinyldichlorosilane. After drying at constant weight, there were obtained 96 g of treated fiber containing 14 percent of carbon by weight.

The infra-red spectrum of the treated fiber exhibited lines which are characteristic of the vinyl group at 967, 1010, 1600 and 3025 cm⁻¹, of the Si—C bond at 690 and 797 cm⁻¹, of the methyl group at 825, 1265, 1410 and 2945 cm⁻¹. These fibers had a surface area of the order of 60 m²/g as determined by the B.E.T. nitrogen-adsorption method.

EXAMPLE 2

One hundred and twenty grams of short fibers of the chrysotile type were placed in a reaction vessel containing 5000 cm³ of 12N HCl, 5000 cm³ of isopropanol and 240 cm³ of methylvinyl-dichlorosilane; the aggregate was agitated, heated and refluxed at 50° C for a period of 16 hours. When the reaction was complete, the mixture was filtered and the fiber was dried after washing with methanol. The reaction mixture can be employed again until depletion of the active components by reaction with further quantities of fibers. In this example, 22.3 % of MgO were extracted. The fiber was perfectly hydrophobic. There were obtained 114 g of treated fiber on which 12 percent of carbon by weight were grafted.

By way of comparison, the reaction of the same products was carried out under similar conditions but by replacing the hydrochloric acid solution with isopropanol which was agitated, heated and refluxed at 55° C for 24 hours. On completion of the reaction, the mixture was filtered and the fiber was dried after washing with methanol. The dried fiber was subjected to extraction with benzene for a period of 24 hours by means of the Soxhlet extractor. Under these conditions, it was possible to graft only 0.87 percent of carbon in contrast to 12 percent in the case in which the operation was performed in an acid medium in accordance with the invention.

EXAMPLE 3

By employing the filtrate of the experiment described in Example 2, by adding 108 g of fibers and 4000 cm³ of 12N HCl and by adopting the same conditions of operation over a period of 16 hours, there were finally obtained 110 g of treated fiber from which 26.5 % of MgO were extracted. The product formed had a carbon content of 13 percent by weight.

EXAMPLE 4

One hundred g of short fibers of the chrysotile type were placed in a reaction vessel containing 4000 cm³ of 12N HCl, 4000 cm³ of isopropyl alcohol and 500 cm³ of allyldimethyl-chlorosilane; the aggregate was agitated, heated and refluxed at 50° C for a period of 56 hours.

On completion of the reaction, the mixture was filtered and the fiber was dried after washing with methanol. After drying at constant weight, there were obtained 167 g of treated fiber containing 23 percent carbon by weight.

The infra-red spectrum of the treated fiber exhibited the lines which are characteristic of the allyl group at 1630 cm⁻¹, of the Si-C bond at 695 and 800 cm⁻¹, of the methyl group at 852, 1270 and 2960 cm⁻¹. The B.E.T. nitrogen-adsorption surface area of the fibers was smaller than 5 m²/g.

The dried fiber was placed in the Soxhlet extractor and subjected to extraction with benzene for a period of 24 hours in order to eliminate the dimer which was formed as a result of dimerization of the silane. Practically the entire quantity of MgO was extracted; after drying at constant weight, there were obtained 69 g of treated fibers containing 77 percent carbon by weight. The infra-red spectrum of the extracted product exhibited the same lines as that of the non-extracted product. The fibers had a B.E.T. surface area of the order of 50 m²/g.

EXAMPLE 5

The mode of operation of Example 4 was repeated but without subjecting the fiber to the extraction process. The non-extracted derivative can be vulcanized by employing 1.5 percent benzoyl peroxide.

There was thus obtained a rubber which was characterized by a vitreous transition point in the vicinity of −50° C and a Young's modulus in the vicinity of 10⁸ dynes/cm².

EXAMPLE 6

30 g of vermiculite (expanded or not) were placed in a reaction vessel with 2000 cm³ of 12N HCl, 2000 cm³ of isopropanol and 120 cm³ of methylvinyl-dichlorosilane. The aggregate was heated and refluxed with agitation for a period of 48 hours.

On completion of the reaction, the mixture was filtered and washed with methanol followed by drying of the grafted mineral. The treated mineral was subjected to extraction with benzene in a Soxhlet extractor for a period of 24 hours. After drying at constant weight, the end product contained 22 percent carbon by weight and was characterized by the following chemical formula:

$$(Si_{5.83}Al_{0.43})O_{11.07}(OH)_{7.73}[=Si(CH_3)(CH=CH_2)]_{5.26}$$

The infra-red spectrum of the grafted vermiculite exhibited the lines which are characteristic of the vinyl group at 967, 1010, 1600 and 3025 cm⁻¹, of the Si—C bond at 690 and 797 cm⁻¹, of the methyl group at 825, 1265, 1410 and 1965 cm⁻¹.

EXAMPLE 7

In a polymerization tube, there were introduced 1 g of chrysotile which had been treated with silanes for 16 hours (see Example 2), 0.034 g of benzoyl peroxide, 3.5 cm³ of redistilled butyl acrylate. The system was degassed in a vacuum and sealed.

The aggregate was maintained for a period of 24 hours at a temperature of 60°C (± 1°C) and then for a period of 24 hours at a temperature of 80° C (1° C). After cooling, the tube was opened and there were obtained 4.4 g of a solid which was subjected to Soxhlet extraction with benzene. After drying, 4.0 g of copolymer containing 52 percent carbon by weight were then collected.

The infra-red spectrum of the copolymer obtained exhibited the bands which are characteristic of the n-butyl polyacrylate chain and in particular the characteristic band of the carbonyl group of ester at 1980 cm⁻¹. These bands were superimposed on the characteristic absorptions of the starting derivative.

Said copolymer had a vitreous transition point in the vicinity of −50° C.

EXAMPLE 8

The rubbery polymer which was obtained in Example 7 was vulcanized by adding 1.5 percent benzoyl peroxide and by molding it in a press for 10 minutes at a temperature of 150° C and under a pressure of 800 kg/cm².

There was thus obtained an elastomer which was characterized by a shear modulus in the vicinity of $10^{-7}$ dynes/cm² (ASTM D 1053) whereas n-butyl polyacrylate which is vulcanized under similar conditions has a modulus in the vicinity of $10^6$ dynes/cm².

EXAMPLE 9

Chrysotile which had been treated with silane for 16 hours (see Example 2) was copolymerized with an alkyl acrylate or methacrylate, styrene or vinyl chloride by adapting the polymerization conditions described in Example 7 to the reactivity of this new co-monomer.

The characteristic lines of the mineral and of the grafted polymeric chain were again observed in the infra-red spectra. The vitreous transition point exhibited by the co-polymers was close to that of the homopolymer which is derived from the grafted chain.

EXAMPLE 10

Copolymerizations which are similar to those of Examples 7 and 9 were carried out by replacing the treated chrysotile with treated vermiculite.

EXAMPLE 11

7.8 g of commercial SBR rubber (styrene-butadiene rubber) and 2.2 g of treated chrysotile were mixed at room temperature in an external mixer for a period of 60 minutes. 0.15 g of benzoyl peroxide was then added and the mixing operation was continued for a further 5 minutes.

The mixture was vulcanized under a pressure of 800 kg/cm² at a temperature of 150C for a period of 10 minutes. There was thus obtained an elastomer having a shear modulus in the vicinity of $5 \times 10^7$ dynes/cm² (ASTM D 1053) at a temperature in the vicinity of room temperature. An SBR rubber which is vulcanized under the same conditions but without filler has a modulus of the order of $4 \times 10^6$ dynes/cm².

EXAMPLE 12

Fourteen g of EPR rubber (ethylene-propylene rubber) were mixed at room temperature for a period of 10 minutes at 30 rpm, then for a period of 5 minutes at 60 rpm. 6 g of chrysotile fibers which had been treated in accordance with Example 2 were then introduced over a period of 10 minutes at approximately the same speed in order to incorporate them in the polymer mass followed by a further introduction of 0.4 g of dicumyl peroxide and 6 mg of sulphur. The mixer was allowed to rotate so as to obtain a total mixing time of 35 minutes and the mixture thus obtained was vulcanized under a pressure of 800 kg/cm² at a temperature of 165° C and for a period of 60 minutes.

There was thus obtained an elastomer which had a shear modulus in the vicinity of $2.20 \times 10^8$ dynes/cm² (ASTM D 1053) at a temperature in the vicinity of room temperature, whereas an E.P.R. rubber which is vulcanized under the same conditions but without filler has a modulus of the order of $1.8 \times 10^7$ dynes/cm².

What we claim is:

1. An organomineral polymeric material consisting essentially of a siliceous mineral two-dimensional framework of a phyllosilicate having at least a tetrahedral layer consisting essentially of silicon and oxygen and an octahedral layer consisting essentially of oxygen and metallic atoms other than silicon, and organic radicals having two to 12 carbon atoms having at least one ethylenic double bond linked by Si-O-Si siloxane bonds to said tetrahedral layer of said phyllosilicate, at least 5 percent by weight of the metallic atoms having been removed from the octahedral layer of the phyllosilicate and substituted by said organic radicals, 1 to 30 percent of the silicon atoms of said tetrahedral layer of said phyllosilicate having said organic radicals grafted on them by Si-O-Si bonds.

2. A method of preparation of an organo-mineral polymeric material having metallic atoms in an octahedral layer comprising the steps of simultaneously subjecting a phyllosilicate at a pH <2 to an acid hydrolysis in a mixture of a mineral acid and an alcohol having a normal concentration between 2 and 8 at a temperature within the range of 15° to 80° C. to eliminate at least 5 percent by weight of the metallic atoms of the octahedral layer, and reacting said phyllosilicate with an organosilane having the formula:

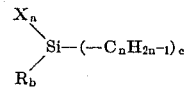

wherein X represents an atom of halogen or a hydroxyl or alternatively an alkoxy group, R represents an atom of hydrogen or an alkyl radical and wherein $a$ is a whole number from 1 to 3, $b$ is a whole number from 0 to 2, with $(a + b + c) = 4$, and wherein $n$ is equal to or greater than 2 and wherein there is present at least one ethylenic double bond.

3. A process according to claim 2, wherein said acid hydrolysis is carried out with 6 N hydrochloric acid at 50° C. for a period between 10 minutes and 10 hours to remove 5 to 25 percent by weight of the octahedral layer and to graft silanic radicals simultaneously on 5 to 30 percent of the silanolic sites formed on the tetrahedral layer.

4. A process according to claim 2 wherein said acid hydrolysis is carried out with 6 N hydrochloric acid at 50° C. for a period between 3 and 50 hours to remove 25 to 100 percent by weight of the octahedral layer and to graft silanic radicals simultaneously on 5 to 30 percent of the silanolic sites formed on the tetrahedral layer.

5. A process according to claim 2 wherein said phyllosilicate is chrysotile, said organosilane is allyldimethylchlorosilane and the product of the reaction is readily vulcanizable.

6. A process according to claim 2 wherein said organosilane is methylvinylchlorosilane.

7. A process to claim 2, including the step of copolymerizing said material with an organic monomer selected from the group consisting of alkylacrylate and methacrylate.

8. A method of preparation of an organo-mineral polymeric strengthening filler for resins, the steps of reacting an organosilane having at least one ethylenic double bond with chrysotile at a pH <2 with an acid-alcohol mixture having a normal concentration between 2 and 8 at a temperature within the range of 15° to 80° C., the chrysotile providing a proportion of solid material in the acid-alcohol mixture in the range of 10 to 500 g/l and a quantity of organosilane providing a weight ratio between the organosilane and the chrysotile of between 0.05, and 0.5, the chrysotile fibers having dimensions of from 200 microns to 4 millimeters, removing by said acid alcohol reaction 5 to 25 percent by weight of the octahedral layer of the chrysotile, said acid being 6 N hydrochloric acid at 50° C., the reaction being carried out for from 10 minutes to 10 hours, the grafting of the silanic radicals simultaneously accurring on 5 to 30 percent of the silanolic sites formed on the tetrahedral layer of the chrysotile.

9. A method of preparation of an organo-mineral polymeric strengthening filler for elastomers, the steps of reacting an organosilane having at least one ethylenic double bond with chrysotile at a pH less than 2 with an acid-alcohol mixture having a normal concentration between 2 and 8 at a temperature within the range of 15° to 80° C., the amount of chrysotile providing a proportion of solid material in the acid-alcohol mixture of from 10 to 500 g/l, the organosilane providing a weight ratio with the chrysotile of between 0.05 and 0.5, the chrysotile fibers having dimensions of from 200 microns to 4 millimeters, removing by said acid alcohol reaction from 25 to 100 percent by weight of the octahedral layer of the chrysotile, the acid being 6 N hydrochloric acid at 50° C., the reaction continuing for from 3 to 50 hours, the simultaneous grafting of the silanic radicals occurring on 5 to 30 percent of the silanolic sites on the tetrahedral layer of the chrysotile.

* * * * *